United States Patent
Cordova

(10) Patent No.: US 6,797,766 B2
(45) Date of Patent: Sep. 28, 2004

(54) HIGH MOLECULAR WEIGHT STYRENIC BLOCK COPOLYMER HOT MELT ADHESIVE FOR TOY ARTICLES

(75) Inventor: Abimael Cordova, Whittier, CA (US)

(73) Assignee: Mattel, Inc., El Segundo, CA (US)

( * ) Notice: Subject to any disclaimer, the term of this patent is extended or adjusted under 35 U.S.C. 154(b) by 223 days.

(21) Appl. No.: 10/035,888

(22) Filed: Dec. 31, 2001

(65) Prior Publication Data

US 2003/0125434 A1 Jul. 3, 2003

(51) Int. Cl.⁷ .............................................. C08L 53/02
(52) U.S. Cl. ..................... 524/505; 525/99; 156/334; 428/355 BL; 446/72; 446/268; 446/391
(58) Field of Search ............................ 524/505; 525/99; 428/355 BL; 446/72, 268, 391; 156/334

(56) References Cited

U.S. PATENT DOCUMENTS

| 4,369,284 A | 1/1983 | Chen ........................... 524/476 |
| 5,786,418 A | 7/1998 | Strelow et al. .............. 524/579 |
| 5,863,977 A | 1/1999 | Fischer et al. .............. 524/505 |
| 5,869,555 A * | 2/1999 | Simmons et al. ........... 524/229 |

* cited by examiner

Primary Examiner—Peter Szekely
(74) Attorney, Agent, or Firm—Robert W. Mulcahy

(57) ABSTRACT

This invention relates to high bonding hot melt adhesive compositions comprising a high molecular weight polystyrene-ethylene/butylene-polystyrene (SEBS) block copolymer as the basic ingredient and articles constructed therefrom. This polymer is useful in a variety of hot melt adhesive applications for consumer product articles subject to hostile use environments such as toys and other play things.

11 Claims, No Drawings

HIGH MOLECULAR WEIGHT STYRENIC BLOCK COPOLYMER HOT MELT ADHESIVE FOR TOY ARTICLES

BACKGROUND OF THE INVENTION

1. Field of the Invention

The present invention relates to a novel adhesive composition and process for forming styrenic based adhesive and cement coatings on thermoplastic polymer surfaces, particularly to toy articles formed of elastomeric materials. Specifically, the present invention relates to hot melt adhesives comprising a high molecular weight polystyrene-ethylene/butylene-polystyrene block copolymer and articles constructed therefrom. These compositions are useful in a variety of hot melt adhesive applications such as children's toys where adhesive composition superior particularly in high bonding strength, heat resistance, and hot-cold cycle resistance properties all particularly suited for unfriendly toy play environments.

2. Description of the Related Art

Children's toys and dolls, in particular, have a history dating back into antiquity. Generally, the technology surrounding the manufacture of dolls centers on creation of an attractive doll face, miniturized application of conventional clothes, manufacture of a doll body using plush or other sculptural techniques, and the simulation of the hair with sculptural elements, fibers, or other techniques. In the case of doll faces, the doll maker has a wide panoply of possible constructions and manufacturing techniques at his disposal. Traditional techniques involve the use of plaster-like or hard plastics material to cast a doll face. In time, however, soft rubber materials such as styrene-butadiene rubber (SBR) and styrene-butadiene-styrene block copolymer (Kraton) elastomers have come to replace plaster and hard plastics in the production of doll heads because of their realistic look and feel.

The soft rubber doll faces include all the normal features of a human figure simulated by the doll including the entire head, including well formed lips, teeth, cheeks, nose, chin, ears, and forehead. After the injection molding of an elastomeric doll face, it is finished by applying a dye or other similar material to give the face a natural skin color. Thereafter the soft rubbery doll's head must be joined to a body portion comprised of a torso and limbs to complete a full bodied toy doll item. This is generally accomplished by gluing, sealing or cementing the soft eleastomeric head potion to the headless body section generally composed of a hard or firm plastic. In selecting an adhesive for the purpose of affixing the dolls' head two considerations are important: (1) that the adhesive form a firm and effective bond and seal between the soft elastomer and the harder resin substrate surface and (2) that the adhesive composition be relatively quick drying so as to accommodate expeditious doll manufacturing processes. The present invention provides a styrenic hot melt adhesive which provides superior bonding and rapid curing or drying.

Hot melt adhesives are recognized as adhesives which are tacky when applied in a molten or "Hot Melt" state. These hot melt adhesives are typically solids and often at room temperature. Block copolymers have been used widely in the hot melt adhesive industry for a variety of applications. Block copolymers are often the preferred polymer base due to their good heat stability, high cohesive strength, and compatibility with a wide range of tackifiers and plasticizers. Kraton G-1651, a styrene-ethylene-butylene-styrene (S-EB-S) linear A-B-A block copolymer, having a molecular weight of about 240,000, was earlier intended for use by the injection molding industry for shoe soles. Due to its relatively high molecular weight, it was largely thought unsuitable for the hot melt adhesive industry, particularly as applied to consumer products such as toys.

Chen in U.S. Pat. No. 4,369,284 teaches dimensionally stable gelatinous elastomer compositions for use in connection with toys, therapeutic hand exercising grips, shock absorbers, acoustical insulators, and other uses. The essential ingredients of Chen consist of high styrene S-EB-S polymer in combination with high levels of plasticizing oil. Since such compositions do not include the use of tackifying resins, and that Chen teaches away from blending such polymers with other polymers, tackifiers, and fillers, such compositions are not useful as adhesives or high bonding cements and sealants generally required for toy items.

In U.S. Pat. No. 5,863,977 to Fischer et al. there is disclosed adhesive formulations using high molecular weight S-EB-S which are useful on products requiring adhesion to human skin properties (wound protective strips) and other adhesives which exhibit low self peel properties for release materials (peelable note paper). The formulations are suitable for such uses but inadequate for high bonding adhesive use in constructing durable use items such as toys and other materials subjected to heavy use or hostile environments.

Conventional block copolymers are very well known and disclosed in various patents such as Collins, U.S. Pat. No. 4,136,699, Malcolm et al., U.S. Pat. No. 5,057,571, Raykovitz et al., U.S. Pat. No. 4,704,110, Sieverding, U.S. Pat. No. 4,833,193, and Mostert, U.S. Pat. No. 4,937,138, all incorporated herein by reference in their entirety.

As indicated above, the class of the styrenic elastomeric materials commonly used as the molding material for toy doll faces and the harder structural portions of toy articles are A-B-A type block polymers such as styrene-butadiene-butylene copolymer-styrene or styrene-butadiene-styrene, manufactured by Shell and sold under the trademark Kraton. In the case of a toy having a hard surface comprised of a rigid or semirigid A-B-A styrene based block copolymer, compatible elastomeric A-B-A styrene copolymer in the form of styrene-ethylene-butylene-styrene, (SEBS, sold under the trademark Kraton-G) has been found to be an exceptional material for use as glues, cements, or sealants to bond mechanical parts in these A-B-A resin based toy items.

For adhesives used to bond toy mechanical parts and the like which are used in rugged or otherwise unfriendly environments it is considered necessary to have not only a high bond strength in normal state but also a high adhesive force to endure the heavy handling of child's play. Moreover, the bonded mechanical parts must even be capable of enduring against extreme or sudden changes in temperature caused by leaving the toy item outdoors or immersing the toy item in hot and cold water, e.g. a child subjecting a doll to a sink bath. As indicated conventional prior art adhesive compositions are not satisfactory in meeting these demands as adhesives in toy items.

It has been found that high molecular weight A-B-A elastomeric block copolymers such as SEBS block copolymer and certain additives results in a hot melt adhesive which not only possesses high shear adhesive force, peeling bond strength and impact adhesive force but also exhibits an outstanding hot-cold cycle resistance and heat resistance, all ideally suited to application to children's toy play articles.

SUMMARY OF THE INVENTION

It has been specifically discovered that A-B-A elastomeric block copolymers such as high molecular weight styreneethylene-butylene-styrene (SEBS) (sold as Kraton G-1651 by the Shell Chemical Co.) can be used as the base adhesive copolymer in a variety of hot melt applications where "quick stick", high tack, flexibility and high cohesive high bond strength are important parameters. Furthermore, the applicants have found that incorporating SEBS along with another compatible A-B-A elastomeric copolymer in certain concentrations can dramatically improve the heat resistance, cold temperature flexibility, and cohesive bonding strength of a variety of adhesive formulations which are particularly useful in the toy industry.

In accordance with the present invention, there is provided an improved adhesive composition particularly useful for toy article applications comprising a hot melt adhesive containing:

(a) from about 50 percent to about 98 percent by weight of a base A-B-A block copolymer having a molecular weight greater than about 200,000, said block copolymer having polystyrene end blocks and a substantially saturated midblock;

(b) from about 1 (one) to 49% percent by weight of another A-B-A compatible elastomeric block copolymer;

(c) from about 0.50 to 5 percent of a liquid plasticizer; and (d) from about 0.50 to 5 percent by weight of a solid tackifying agent, wherein these basic adhesive ingredients total 100% by weight. The instant hot melt adhesive composition has a viscosity of about 2,000 to about 50,000 cP (centipoise) at 200 degrees C. and a melting point of about 150° C. to about 200° C. It is preferable that the block copolymer and the other A-B-A compatible elastomeric copolymer ingredients together comprise from about 90 to 98 weight percent of the total composition, the other second ABA compatible copolymer being present an amount of from about 20 to 35 weight percent being.

Adhesive compositions exhibiting high tack in combination with high cohesive strength are useful in a variety of applications. These adhesive formulations display unique adhesion to thermoplastic substrates in general and styrenic surfaces in particular forming strong cohesive bonding between adjoined surfaces of these materials particularly effective in the manufacture of hostile-use play toy items such as dolls. The instant hot melt adhesives are useful in application because they can be expeditiously spot applied by hot melt guns to affix or laminate fixtures in or to elastomeric substrate toy articles. Other applications for which the instant SEBS hot melt adhesive compositions are useful include any adjoined surfaces of articles comprised of thermoplastic resin materials such as internal automobile dashboard components, gaskets, outside surface repair kits, and other flexible attachment adhesive applications.

A preferred A-B-A copolymer of the present invention is high molecular weight styrene-ethylene-butylene-styrene (SEBS). The styrenic SEBS copolymer adhesive compositions made in accordance with the present invention are heated a rapid manner to enable a strong bond of the copolymer with polymeric substrate surfaces thereby engendering firm bonding of one surface with a substrate surface; that is, a sandwiched film of adhesive between an applied blanket cover to a substrate or one material surface or point affixed to another will afford an extremely strong bond between the two joined surfaces. The discovery of the present invention is best described as a mixture of polymeric additives, plasticizers, and high molecular SEBS which molecularly rearrange to produce excellent strong bond adhesive properties at high temperatures of up to 350° C. and can be applied and manipulated at temperatures of from about 180° C. to 200° C. The use of SEBS in combination with the other compatible elastomeric polymer and tackifier resins allow adjoined or laminated surfaces to cohesively and strongly bond with one another with a necessary elasticity in the bonding or lamination for most applications, especially toy manufacturing. This adhesive composition is optimally used for gluing soft flexible elastomeric webs or covers onto hard A-B-A styrenic copolymer substrate surfaces. It enables the flexibility necessary for gluing or working two elastomeric polymeric materials. The adhesive compositions herein have particular advantage and application to children's toys because of the toy industry's pervasive use of styrenic block soft and hard elastomeric materials where soft elastomeric materials are used in doll facial structures and the adhesion of these rubber facial structures to a hard resin torso and limb structure is expected to withstand the rigorous and hostile environment of child use.

In a further embodiment, the present invention is even more particularly directed to a adhesive coating composition for elastomeric substrates comprising:

(a) about 50 percent to about 98 percent by weight of an A-B-A block copolymer having a molecular weight greater than about 200,000, said block copolymer having polystyrene end blocks and a substantially saturated midblock copolymer and selected from the group comprising styrene butadiene rubber (SBR), styrene-butadiene-styrene (S-B-S), and styrene-ethylene-butylene styrene (SEBS) elastomeric block copolymers;

(b) from about 1 to 49 percent by weight of another A-B-A compatible block copolymer in which the B segment is selected from the group consisting essentially of polyethylene, polypropylene, polybutylene, isoprene, and combinations thereof (eg. S-EP-S);

(c) from about 0.5 to 5 wt percent of a compatible liquid plasticizer; and (d) from about 0.5 to 5 percent by weight of a compatible solid tackifing agent.

DETAILED DESCRIPTION OF THE INVENTION

The critical and basic component of the hot melt adhesive of this invention, present in the amount of about 50% to about 98% by weight, comprises a substantially linear A-B-A block copolymer having a weight average molecular weight in excess of about 200,000 as measured by Gel Permeation Chromatography, with values reported relative to polystyrene standards; wherein said A block is polystyrene and said B block is ethylene-butylene, ethylene-propylene, or mixtures thereof. The preferred elastomeric block copolymers or the instant invention are high molecular weight styrene-ethylene-butylene-styrene (SEBS or S-EB-S). Polymers of this type, such as Kraton G-1651, are twice the molecular weight of conventional S-EB-S block copolymers intended for the general hot melt adhesive industry. Preferred quantities of the basic adhesive component herein ranges from about 70% to 90% by weight.

The applicants have found that the subject preferred high molecular weight S-EB-S block copolymer may also have added thereto, another compatible A-B-A triblock copolymer, an A-B diblock copolymer, an A-B-A-B-A-B multiblock copolymer or radial block copolymer, and grafted versions of such including Shell Chemical's TKG-101 and RP-6912. Such A-B-A block polymers are disclosed in Collins et al., U.S. Pat. No. 4,136,699, herein incorporated by reference in its entirety, or are available under the tradename of Kraton G-1654 commercially available from Shell Corporation. It is anticipated that grafted modifications of Kraton G-1651 to exhibit even greater improvements in the tack and cohesive bonding properties set forth herein. At small concentrations (less than about 4%) Kraton G-1651 may also be blended with other polymers such as EVA (ethylene vinyl-acetate), EMA (ethylene metyl-acrylate), as well as crystalline and amorphous polyolefins. The use of additional block copolymers is preferred if one desires to reduce the viscosity to improve the proccessability of the adhesive and/or increase the tack for some applications, but is not necessary to the instant invention. Preferred compatible block co-polymers as the compatible ingredient include A-B-A compatible block copolymer in which the B segment is selected from the group consisting essentially of polyethylene, polypropylene, polybutylene, isoprene, and combinations thereof (eg. S-EP-S (styrene-ethylene-propylene-styrene), SPBS (styrene-propylene-butylene-styrene) S-I-S (styrene-isoprene-styrene), SBS (styrene-butylene-styrene) etc.)

Tackifying Resin

The adhesive of the invention contains a tackifying resin. Tackifying agents are present in amounts up to 5% by weight. Preferably, the resin is present in an amount of 0.5 to 5 weight percent. Tackifying resins useful in the adhesives of the invention comprise resins derived from renewable resources such as rosin derivatives including wood rosin, tall oil, gum rosin; rosin esters, natural and synthetic terpenes, and derivatives of such. Aliphatic, aromatic or mixed aliphatic-aromatic petroleum based tackifiers are also useful in the adhesive of this invention. Representative examples of useful hydrocarbon resins includes alpha-methyl styrene resins, branched and unbranched $C_5$ resins, $C_9$ resins, $C_{10}$ resins, as well as styrenic and hydrogenated modifications of such. Tackifying resins range from being a liquid at 37 degrees C. to having a ring and ball softening point of about 135 degrees C. A preferred tackifying agent is a hydrogenated C.10 resin. The tackifying resins can be selected from any of the nonpolar types, which are commercially available. An example of a commercially available tackifying resin which is useful for the present invention includes the resin which is identified commercially by the trade designation Escorez 1310 LC and which is manufactured by Exxon Chemical Company. Normally, nonpolar tackifying resins which are useful with the present invention include resins which have partially, or completely hydrogenated $C_9$ or $C_5$ based hydrocarbon resins with softening points that are in a range of approximately 70 degrees C. to approximately 125 degrees C. Tackifying resins which are useful for the present invention can perhaps include polar tackifying resins, however, the choice of available polar tackifying resins is limited in view of the fact that many of the polar resins appear only partially compatible with the SEBS copolymer. As noted above, the tackifying resin selected which is useful with the present invention will be about 0.5% to about 5%, by weight, of the entire adhesive composition and more preferably about 2–3% thereof.

Plasticizers

A plasticizer is broadly defined as a typically organic composition that can be added to thermoplastics, rubbers and other resins to improve extrudability, flexibility, workability, or stetchability. A minimum amount of fluid ingredient is necessary to the present invention. Such fluid ingredient may be provided as a plasticizer, a liquid resin, a liquid elastomer or any other material which flows at ambient temperatures. Plasticizers are used in the adhesive of this invention. Preferably the plasticizing agent is a liquid at ambient temperature, such as hydrocarbon oils, polybutene, liquid tackifying resins, liquid elastomers, and is present in amounts up to 5% by weight of the adhesive. Such oils are primarily hydrocarbon oils, low in aromatic content and are paraffinic or napthenic in character. The oils are preferably low in volatility, transparent and have as little color and odor as possible. The use of plasticizers in this invention also contemplates the use of olefin oligomers, low molecular weight polymers, vegetable oils and their derivatives and similar plasticizing liquids. The plasticizer that finds usefulness in the present invention can be any number of different plasticizers but it has been discovered that a plasticizer which include mono-olefin polymers such as what is commercially available under the trade designation Indopol H-100, and which is manufactured by Amoco, is particularly useful in the present invention as being compatible with SEBS. As will be appreciated, plasticizers have typically been employed to lower the viscosity of the overall adhesive composition without substantially decreasing the adhesive strength and/or the service temperature of the adhesive. The present adhesive composition has a viscosity of about 2,000 cP to about 50,000 cP at 200 degrees C., and a melting point of about 150. degrees C. to about 200 degrees C. In view of the unexpectedly favorable viscosities, the adhesive composition of the present invention has spraying characteristics when employed with conventional manufacturing equipment.

The hot melt adhesive composition of the present invention may include about 0.1% to about 3%, by weight, of an antioxidant. As a general matter it is understood that antioxidants and stabilizers are important to protect the otherwise vulnerable copolymer and thereby the adhesive composition from the deleterious effects of thermal and oxidative degradation which is frequently experienced during the manufacture and application of adhesive compounds as well as in the ordinary use of the final product. It should be understood that this degradation usually manifests itself by the deterioration of the adhesive composition in appearance, physical properties and performance. Among the most useful stabilizers are high molecular weight hindered phenols, and multifunctional phenols, such as sulfur, and phosphorous-contain phenols. In this regard, hindered phenols are well known to those skilled in the art, and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxyl groups. The presence of the sterically bulky substituted radicals in the vicinity of the hydroxyl group is believed to retard its stretching frequency and correspondingly its reactivity. This steric hindrance is believed to provide the phenolic compounds with its stabilizing properties. A suitable antioxidant for use with the present invention is commercially available from CIBA-GEIGY Company under the tradename Igranox 1010.

As is known in the art, various other components can be added to modify the tack, color, odor, etc., of a hot melt adhesive. It is generally preferred that the other components or ingredients should be used in small amount, be relatively inert and have negligible effects upon the properties contributed by the block copolymer, tackifying agent, and plasticizing oil. Antioxidants and other stabilizing ingredients can also be added to protect the adhesive from various heat and light induced degradation, but are not essential to the compositions of this invention.

The SEBS hot melt adhesive composition of the present invention may be formulated using any of the techniques known in the art. A representative example of the prior art procedure involves placing all of the plasticizer and stabilizer in a jacketed mixing kettle, and preferably in a jacketed heavy duty mixer of the Baker-Perkins or Day type and which is equipped with rotors and thereafter raising the temperature of this mixture to a range of about 180 degrees C. to about 200 degrees C. It should be understood that the precise temperature to be used in this step will depend upon the melting point of the particular ingredients. When the initial mixture, noted above, has been heated, the mixture is blanketed in carbon dioxide at a slow flow rate, and the resin described above is slowly added. When the resin is melted, and the desired temperature is reached, the copolymer is added to the mixture. The resultant adhesive composition mixture is then agitated until the copolymer is completely dissolved. A vacuum is then applied to the mixture to remove any entrapped air.

As indicted above, optional additives may be incorporated into the hot melt construction adhesive composition in order to modify particular physical properties. These additives may include colorants, such as titanium dioxide and fillers such as talc and clay.

The invention is further illustrated by way of the examples noted below. In this regard, an adhesive composition in accordance with the teachings of the present invention is made by the general procedure described above. A generally practical and preferred recipe is as follows:

Adhesives Useful as Hot Melts

| | wt % |
|---|---|
| Kraton G-1651 | 70.0–90% |
| Compatible Block Copolymer | 20–35% |
| Solid Tackifier | 1–3% |
| Liquid Tackifier/Plasticizing Oil | 1–3% |

EXAMPLE 1

A more specific embodiment of this adhesive composition has the following constituent elements:
a) about 50%, by weight, of a high molecular weight styrene-ethylene-butylene-styrene copolymer;
b) about 45%, by weight, of a styrene-isoprene-styrene copolymer;
c) about 3%, by weight, of a tackifying resin;
d) about 3%, by weight, of a plasticizer; and
about 0.1% to about 3%, by weight (based on the 100% calculated base adhesive composition above), of a hindered phenolic antioxidant and wherein the hot melted adhesive composition following application displayed an improved open time, and room temperature flow properties, and further had a viscosity of about 2,000 cP at 200 degrees C., and a melting point of about 150.degrees C.

More specifically, the high molcular weight styrene-ethylene-butylene-styrene copolymer was commercially secured from Shell Chemical Company under the tradename Kraton 1651; the compatible S-I-S copolymer was purchased from the Shell Chemical Company; the tackifying resin was commercially secured from Exxon Chemical Company under the tradename Escorez 1310 LC; the plasticizer was commercially secured from Amoco Chemical Company under the trade designation Indopol H-100; and the antioxidant was commercially secured under the trade designation Irganox 1010 from the CEBA-GEIGY Company.

The resulting hot melt adhesive composition, upon testing, was found useful for the construction of a doll item comprised of a soft elastomeric facial portion and a hard resin torso body portion. The prepared SEBS adhesive composition was applied to the elastomeric skin, the skin fastened to the body torso to form a doll structure, and thereafter the entire doll item subjected to a temperature of between 180–200° C. to bond the facial skin to the body by means of the applied SEBS adhesive. Further, this particular SEBS adhesive formulation was sprayed on various substrates, heated, and found to be generally acceptable for all intended bonding purposes. The specific performance characteristics of this preferred formulation and the examples which follow are discussed in greater detail hereinafter.

EXAMPLE 2

A second example of the adhesive composition was formulated and had the following characteristics:
a) about 70%, by weight, of a high molecular weight SEBS copolymer;
b) about 28%, by weight, of an SEBS compatible styrene-isoprene-styrene (S-I-S) elastomeric block copolymer;
c) about 1%, by weight, of a tackifying resin;
d) about 1%, by weight, of a plasticizer; and
e) about 1%, by weight (based on the 100% weighted adhesive composition above), of a hindered phenolic antioxidant, wherein the adhesive composition has a viscosity of about 4000 centiPOISE at a temperature of about 180 degrees C. and a melting point of about 150. degrees C.

Once again this adhesive formulation was applicable to bonding of toy items. Indeed in each of the examples, noted above, it was found that adhesives formulated in accordance with these examples were useful for constructing toys in that strong cohesive bonding occurred between adhesive applied resin surfaces.

As noted earlier, traditional hot melt adhesives which had been formulated using SIS, SBS, SEBS and APAO (amorphous polyalpha olefin) have a propensity when exposed to water for prolonged periods of time, to lose their bond strengths, with the result that laminations prepared with such adhesives will fail when exposed for prolonged periods of time to water. This presents a problem with toy doll playthings in that children freqently bath their dolls in both hot and cold water. As should be understood, such delaminations of an adjoined or pendant element in a resin constructed toy such as a doll or the like may cause the toy item's core integrity to fail with resulting undesirable effects such as pealing parts or general disassembly. As can be appreciated, the instant combination of SEBS with another SEBS compatible elastomeric copolymer in a hot melt adhesive overcomes any such deficiency in an adhesive.

In addition to the foregoing, the high molecular weight styrenic copolymer adhesive composition of the present invention has a relatively low viscosity and melting point compared with prior art hot melts, which makes this a very desirable adhesive for use with the more traditional application methods.

Therefore, it will be seen that the hot melt adhesive of the present invention provides a fully dependable and practical means for adhesively assembling a hard and soft resin item such as a toy or the like, and which further avoids the detriments associated with the prior art practices which includes, among others, employing several different adhesive compositions for assembling resin constructed toys. In addition to the foregoing, the improved hot melt adhesive of the present invention shows surprising and unusually desirable manufacturing viscosities when compared with the prior art, and further has peel and cohesive bonding strengths, following exposure to water which are greatly improved in relative comparison to the prior art.

Having thus described the principals of the invention, together with illustrative embodiments thereof, it is to be understood that although specific terms are employed, they are used in a generic and descriptive sense and not for the purpose of limitation, the scope of the invention being set forth in the following claims.

What is claimed:

1. A toy article having laminate or affixture bondings of an adhesive comprising:
   (a) from about 50 percent to about 98 percent by weight of a base A-B-A block copolymer having a weight average molecular weight greater than about 200,000, said block copolymer having polystyrene end blocks and a substantially unsaturated midblock;
   (b) from about 1 to about 49 percent by weight of another A-B-A compatible block copolymer;
   (c) from about 0.5 to 5 percent of a liquid plasticizer; and
   (d) from about 0.50 to 5 percent by weight of solid tackifing agent.

2. The toy item of claim 1 wherein the base A-B-A block copolymer of the adhesive composition comprises an A block of polystyrene and a B block consisting of ethylene-butylene, ethylene-propylene, butylenes, or mixtures thereof.

3. The toy article of claim 1 wherein the other A-B-A compatible block copolymer is selected from the group consisting of A-B-A triblock copolymer, an A-B diblock copolymer, an A-B-A-B-A-B multiblock copolymer or radial block copolymer, and grafted versions thereof.

4. The toy article of claim 3 wherein the compatible copolymer is an A-B-A triblock copolymer and the B segment of the A-B-A copolymer is selected from the group consisting of polyethylene, polypropylene, polybutylene, isoprene, and combinations thereof.

5. The toy article of claim 1 wherein the A-B-A portion of the base adhesive comprises from about 70% to 90.0 weight % of the adhesive composition.

6. A toy article having laminate or affixture bondings of an adhesive comprising:
   (a) about 50 percent to about 98% percent by weight of an A-B-A block copolymer having a weight average molecular weight greater than about 200,000, said block copolymer having polystyrene end blocks and a substantially unsaturated midblock copolymer and selected from the group comprising styrene butadiene rubber (SBR), styrene-butadiene-styrene (S-B-S), and styrene-ethylene-butylene styrene (SEBS) elastomeric block copolymers;
   (b) from about 1 to 49 percent by weight of another compatible A-B-A block copolymer; in which the B segment of the A-B-A copolymer is selected from the group consisting essentially of polyethylene, polypropylene, polybutylene, isoprene, and combinations thereof;
   (c) from about 0.5 to 5 percent of a liquid plasticizer;
   (d) from about 0.5 to 5 percent by weight of a tackifing agent.

7. The toy article of claim 6 wherein the basic A-B-A block copolymer of the adhesive composition comprises SEBS (styrene-ethylene-butylene-styrene)copolymer.

8. The toy article of claim 6 in which the compatible copolymer is an A-B-A triblock copolymer.

9. The toy article of claim 7 wherein the SEBS copolymer is present in an amount of from about 70% to 90 weight % of the composition.

10. The toy article of claim 1 wherein basic A-B-A block copolymer of the adhesive composition comprises SEBS (styrene-ethylene-butylene-styrene) copolymer.

11. The toy article of claim 10 wherein the SEBS is present in an amount of from about 70% to 90 weight % of the composition.

* * * * *